(12) United States Patent  (10) Patent No.: US 8,789,300 B2
Rowley  (45) Date of Patent: Jul. 29, 2014

(54) ATTACHABLE FLAME SIMULATING APPARATUS

(76) Inventor: John Rowley, Gastonia, NC (US)

( * ) Notice: Subject to any disclaimer, the term of this patent is extended or adjusted under 35 U.S.C. 154(b) by 0 days.

(21) Appl. No.: 13/314,048

(22) Filed: Dec. 7, 2011

(65) Prior Publication Data

US 2012/0167421 A1 Jul. 5, 2012

Related U.S. Application Data

(60) Provisional application No. 61/420,494, filed on Dec. 7, 2010, provisional application No. 61/469,191, filed on Mar. 30, 2011.

(51) Int. Cl.
*G09F 21/04* (2006.01)
*G09F 13/20* (2006.01)
*B60D 1/58* (2006.01)

(52) U.S. Cl.
CPC .............. *G09F 21/04* (2013.01); *G09F 13/20* (2013.01); *B60D 1/58* (2013.01)
USPC ............................................. 40/591

(58) Field of Classification Search
USPC ............ 40/428, 591; D12/162, 400; 280/507
See application file for complete search history.

(56) References Cited

U.S. PATENT DOCUMENTS

| 6,079,136 | A  | * | 6/2000 | Kozlarek ........................ 40/541 |
| D471,137 | S  | * | 3/2003 | Shepherd et al. ............ D12/162 |
| 6,553,697 | B1 | * | 4/2003 | Pichan ............................ 40/591 |
| 6,910,705 | B1 | * | 6/2005 | Harwood et al. ............. 280/507 |
| 7,093,949 | B2 | * | 8/2006 | Hart et al. ........................ 362/96 |

* cited by examiner

*Primary Examiner* — Joanne Silbermann

(74) *Attorney, Agent, or Firm* — Tillman Wright, PLLC; Chad D. Tillman; Jeremy C. Doerre

(57) ABSTRACT

An attachable flame simulating apparatus includes a coupling appendage, having a distal end and a proximal end, a housing adjacent the proximal end of the coupling appendage, the housing comprising one or more light sources, and a projection surface extending from the housing. Furthermore, the distal end of the coupling appendage is removably attachable to a vehicle.

20 Claims, 6 Drawing Sheets

ATTACHABLE FLAME SIMULATING APPARATUS

CROSS-REFERENCE TO RELATED APPLICATIONS

The present application is a U.S. nonprovisional patent application of, and claims priority under 35 U.S.C. §119(e) to, each of U.S. provisional patent application Ser. No. 61/420,494, filed Dec. 7, 2010, and U.S. provisional patent application Ser. No. 61/469,191, filed Mar. 30, 2011, which provisional patent applications are hereby incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to flame simulating devices and vehicle ornamentation. More specifically, the present invention relates to an attachable flame simulating apparatus.

From the outside, vehicles can often be rather impersonal. Drivers are constantly looking for new and exciting ways to inject some humor and personality to the outer appearance of their vehicle.

A need exists for improvement in attachable flame simulating apparatuses. This, and other needs, are addressed by one or more aspects of the present invention.

SUMMARY OF THE INVENTION

The present invention includes many aspects and features. Moreover, while many aspects and features relate to, and are described in, the context of attachable flame simulating apparatuses, the present invention is not limited to use only in flame simulating devices, as will become apparent from the following summaries and detailed descriptions of aspects, features, and one or more embodiments of the present invention.

Accordingly, one aspect of the present invention relates to an attachable flame simulating apparatus as substantially shown and described.

Another aspect of the present invention relates to an attachable flame simulating apparatus. An exemplary such apparatus includes a coupling appendage, having a distal end and a proximal end, a housing adjacent the proximal end of the coupling appendage, the housing comprising one or more light sources, and a projection surface extending from the housing. Furthermore, in this aspect of the invention, the distal end of the coupling appendage is removably attachable to a vehicle.

In a feature of this aspect of the invention, the distal end of the coupling appendage is adapted to fit a receiver-type trailer hitch. In a variation of this feature, the receiver-type trailer hitch is a Class I type hitch. In another variation of this feature, the receiver-type trailer hitch is a Class II type hitch. In another variation of this feature, the receiver-type trailer hitch is a Class III type hitch. In another variation of this feature, the receiver-type trailer hitch is a Class IV type hitch. In another variation of this feature, wherein the receiver-type trailer hitch is a Class V type hitch.

In another feature of this aspect of the invention, coupling appendage further comprises a first pair of opposing holes positioned to align with a second pair of opposing holes located on the receiver-type hitch, such that when the first pair of opposing holes is aligned with the second pair of opposing holes, a locking pin may be inserted therethrough to securely attach the coupling appendage to the receiver-type hitch.

In at least some implementations, a locking nub or nubs are utilized in lieu of an opposing holes and pin arrangement.

In yet another feature of this aspect of the present invention, the housing further comprises a fan. In a variation of this feature, the fan is electrically powered.

In another feature, the housing contains a flywheel.

In still another feature of this aspect of the invention, the housing is generally cylindrical in shape.

In yet another feature, the housing comprises a hollowed out interior portion.

In a further feature, the housing comprises one or more openings adapted to allow air to travel therethrough.

In yet a further feature, the one or more light sources are positioned on a surface of the housing opposite coupling appendage. In a variation of this feature, the surface of the housing opposite the coupling appendage is angled. In yet another variation, the surface of the housing opposite the coupling appendage is angled to optimally direct light toward the projection surface. In an alternative variation, the one or more light sources are angled. In yet another variation, the one or more light sources are angled to optimally direct light toward the projection surface.

In another feature of this aspect, the projection surface is secured to the housing.

In another feature of this aspect, the projection surface is secured to the housing with screws.

In yet another feature, the projection surface is secured to the housing with nuts and bolt.

In another feature of this aspect, the projection surface is secured to the housing with adhesive.

In still a further feature, the projection surface is secured to the housing with clips.

In yet a further feature, the projection surface is secured to the housing with magnets.

In a further feature still, the projection surface is secured to the housing with two diametrically opposed, inwardly-extending tangs. In a variation of this feature, the projection surface includes one or more pockets, each of the one or more pockets being adapted to receive a tang, such that receipt of the tangs securely fastens the projection surface to the housing.

In yet another feature of this aspect of the invention, the projection surface resembles a flame.

In yet another feature, the projection surface is flexible.

In still a further feature, the projection surface is rigid. In a variation of this feature, the projection surface is hinged. In still another variation, the projection surface is mechanically attached to the housing.

In another feature of this aspect of the invention, the apparatus is electrically hardwired to the vehicle.

In still another feature, the apparatus further comprises one or more batteries.

In yet another feature, the apparatus further comprises one or more solar panels.

In another feature, the apparatus further comprises one or more fuel cells.

In still another feature, the apparatus further comprises a portable nuclear reactor.

In another feature of this aspect of the invention, the apparatus includes an adapter plug configured to connect to a trailer electrical receptacle.

In still another feature, the apparatus is electrically integrated with the vehicle. In a variation of this feature, the apparatus responds in a predetermined manner when the vehicle's headlights are activated. In another variation, the apparatus responds in a predetermined manner when the vehicle's brakes are applied. In yet another variation, the apparatus responds in a predetermined manner when the vehicle's turn signals are activated. In still another variation the apparatus responds in a predetermined manner when the vehicle's hazard lamps are activated. In another variation, the brightness of the one or more light sources is proportional to the acceleration or deceleration applied to the vehicle. In still another variation, the one or more light sources are adapted to dim when the vehicle is decelerated.

Another feature of this aspect includes one or more additional projection surfaces.

In another feature, the projection surface includes printing thereon.

In still another feature, the vehicle is a non-motorized vehicle. In a variation of this feature, the non-motorized vehicle is a bicycle.

In another feature, the vehicle is a car.

In still another feature, the vehicle is a truck.

In yet another feature, the vehicle is a tractor.

In another feature still, the vehicle is a trailer.

In yet a further feature, the vehicle is an ATV.

In another feature, the vehicle is an electrically powered vehicle.

In still another feature, the vehicle is a motorcycle.

In another feature, the vehicle is a watercraft.

In still another feature, the vehicle is a flying vehicle.

In yet another feature of this aspect of the invention, the apparatus further comprises an air deflector positioned to direct air through the housing.

In a variation of this feature, the air deflector is an air scoop. In yet another variation, the air deflector directs air toward the housing via a duct. In yet another variation, the air deflector directs air toward the housing via a rigid duct. In yet another variation, the air deflector directs air toward the housing via a flexible duct. In yet another variation, the air deflector directs air toward the housing via a swiveling duct.

In still another variation of this feature, the air deflector is removably attachable directly to the vehicle. In another variation, the air deflector is removably attachable to a receiver-type trailer hitch.

Another aspect of the present invention relates to an attachable flame simulating apparatus. An exemplary such apparatus includes a housing, having one or more electrical/mechanical components, and a projection surface extending from the housing. Furthermore, the housing is removably attachable to a vehicle.

In a feature of this aspect of the present invention, the housing is attached to the vehicle with brackets.

In yet another feature, the housing is attached to the vehicle with screws.

In still another feature, the housing is attached to the vehicle with nuts and bolts.

In another feature, the housing is attached to the vehicle with magnets.

In yet another feature, the housing is attached to the vehicle via a receiver-type trailer hitch.

In another feature, the housing is attached to an intermediary attachment device, and the intermediary attachment device is attached to the vehicle via a receiver-type trailer hitch.

In still a further feature, the electrical/mechanical components include one or more light sources.

In yet another feature, the electrical/mechanical components include a fan.

Another aspect of the present invention relates to a method of simulating a rocket powered vehicle, as substantially shown and described.

Another aspect of the present invention relates to a method of simulating a rocket powered vehicle. An exemplary such method includes the steps of providing an attachable flame simulating apparatus having a coupling appendage with a distal end and a proximal end, a housing adjacent the proximal end of the coupling appendage, the housing comprising one or more light sources, an adapter plug in electrical connection with the one or more light sources, and a projection surface extending from the housing. Furthermore, the method includes inserting the distal end of the coupling appendage into a receiver-type trailer hitch and plugging the adapter plug into a trailer electrical receptacle.

In a feature of this aspect, the method further includes attaching an air deflection device to the vehicle.

In another feature of this aspect, the method includes attaching an air deflection device to the vehicle and positioning the air deflection device to deflect air directly through the housing.

In another feature of this aspect, the method includes attaching an air deflection device to the vehicle and positioning the air deflection device to deflect air toward the housing.

In a feature of one or more aspects, the attachable flame simulating apparatus is configured to simulate the appearance of multiple flames.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
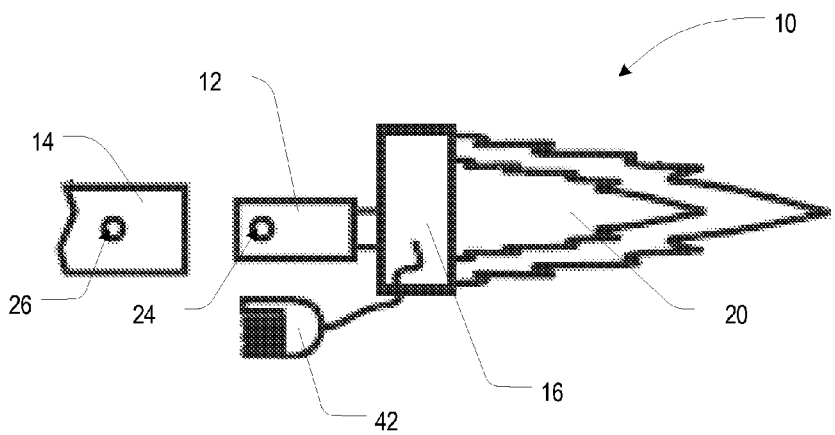
FIG. 1 is a side view of an attachable flame simulating apparatus in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Figure 2:
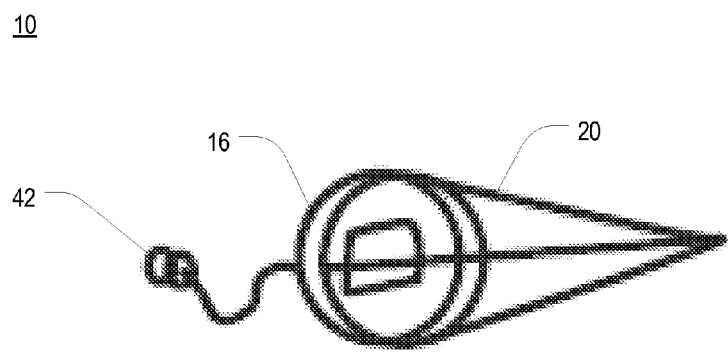
FIG. 2 is a perspective view of the attachable flame simulating apparatus of FIG. 1.
Figure 3:
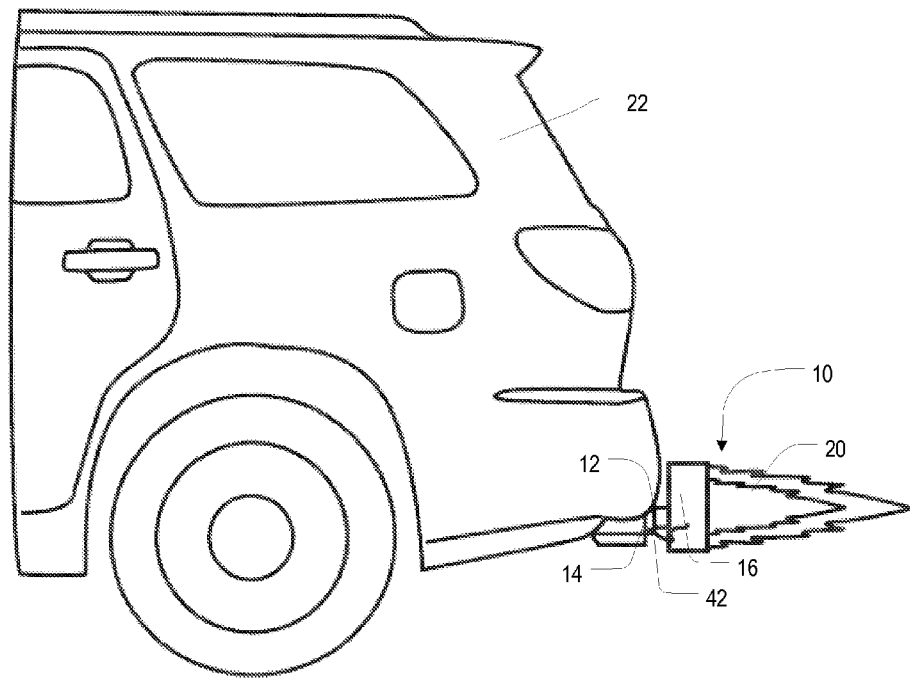
FIGS. 3-4 are side and perspective views, respectively, of the flame simulating apparatus of FIG. 1 attached to a receiver-type trailer hitch of a vehicle.
Figure 4:
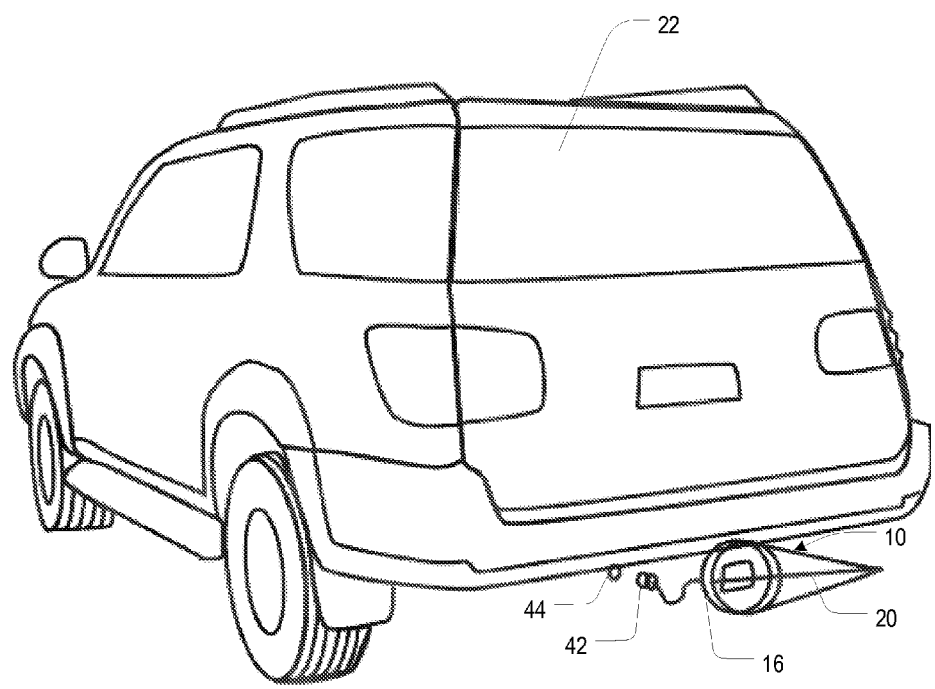
Figure 5:
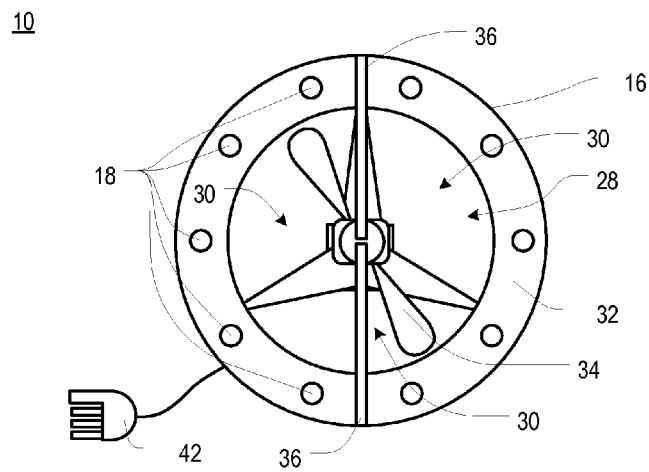
FIG. 5 is a rear view of the attachable flame simulating apparatus of FIG. 1.
Figure 6:
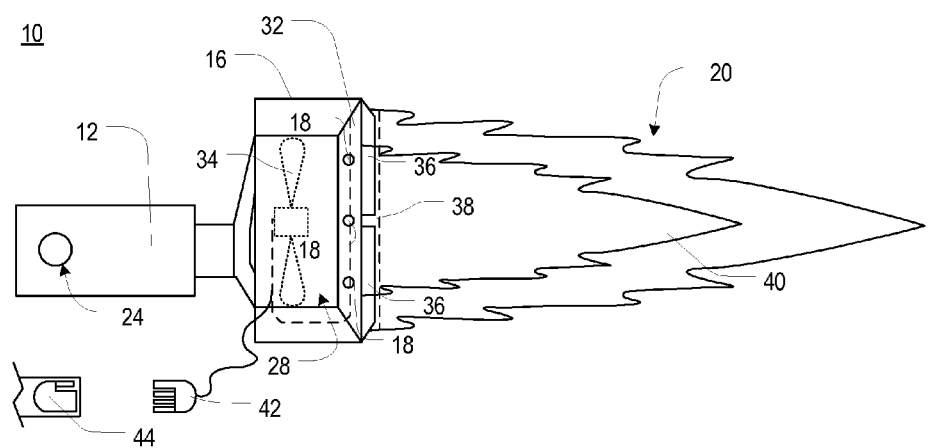
FIG. 6 is a detailed side view of the flame simulating apparatus of FIG. 1.

FIG. 1 is a side view of an attachable flame simulating apparatus 10 in accordance with one or more preferred embodiments of the present invention. As seen in FIG. 1, an attachable flame simulating apparatus 10 comprises a coupling appendage 12 adapted to be removably attachable to a vehicle receiver-type trailer hitch 14, a housing 16 containing one or more light sources 18, and a projection surface 20. FIG. 2 is a perspective view of the attachable flame simulating apparatus 10 of FIG. 1. FIGS. 3-4 are side and perspective views, respectively, of the flame simulating apparatus 10 of FIG. 1 attached to a receiver-type trailer hitch 14 of a vehicle 22. Although FIGS. 3 and 4 illustrate the flame simulating apparatus 10 attached to a automobile, it will appreciated that the flame simulating apparatus 10 may be used with any variety of vehicle, including, but not limited to, cars, trucks, tractors, trailers, motorcycles, scooters, golf carts, snow mobiles, dirt bikes, ATVs, other on and off road vehicles, watercrafts, including boats and jet skis, hovercrafts, and flying vehicles. FIG. 5 is a rear view of the attachable flame simulating apparatus 10 of FIG. 1. FIG. 6 is a detailed side view of the flame simulating apparatus 10 of FIG. 1.

As perhaps best illustrated in FIGS. 1 and 6, the coupling appendage 12 of the attachable flame simulating apparatus 10 comprises a distal end, adapted to be inserted into a receiver-type trailer hitch 14, and a proximal end, adapted to attach to the housing 16. Alternatively, the coupling appendage 12 is attachable to an intermediary attachment device, which intermediary attachment device, in turn, is attachable to a receiver-type trailer hitch 14. The coupling appendage 12 has a generally square cross-section and is sized to fit any common class receiver-type hitch, including Class I and II type hitches, having 1.25-inch sides, and Class III, IV, and V type hitches, having 2-inch or 2.5-inch sides. The coupling appendage 12 further includes one or more pairs of opposing holes 24 configured to align with holes 26 in the receiver-type trailer hitch 14. Upon insertion of the coupling appendage 12 into the opening of a vehicle trailer hitch 14, the holes 24,26 align and become capable of receiving a locking pin (not shown) to securely attach the flame simulating apparatus 10 to the vehicle trailer hitch 14.

The attachable flame simulating apparatus 10 further comprises a housing 16 containing electrical and/or mechanical components, such as light sources, fans, and flywheels. It will be appreciated that the housing 16 can be of generally any shape or size; however, in one or more preferred embodiments, the housing 16 is generally cylindrical in shape with a hollowed out interior portion 28 and one or more air openings 30 positioned to allow air to flow through the housing 16 when the vehicle 22 is in motion. As perhaps best seen in FIGS. 5 and 6, the housing 16 is affixed to the proximal end of the coupling appendage 12. Furthermore, light sources 18 are positioned along a circular rear surface 32 of the housing 16 generally opposite the coupling appendage 12. The surface 32 may be angled to direct the light emitted in a specific direction, particularly toward the projection surface 20. The projection of the light on the projection surface 20 enhances the appearance of a flame. In at least one embodiment, the light sources 18 are multicolored to enhance the appearance of the flame.

The projection surface 20 may be comprised of various materials. In at least one embodiment, the projection surface is comprised of an optically transparent material to more closely resemble a real flame. In at least one other preferred embodiment, the projection surface is comprised of fabric. It will be appreciated that a visually sheer fabric will produce a better flame simulation. In one or more other preferred embodiments, the projection surface is comprised of a polymer film.

Furthermore, in accordance with one or more preferred embodiments of the present invention, the hollowed out interior portion 28 of the housing 16 includes a fan 34 therein. Air flowing through the one or more air openings 30 causes the fan 34 to rotate and direct air toward the projection surface 20. Optionally, the fan 34 may be powered to maintain airflow even when the vehicle 22 is not in motion. Alternative embodiments of the present invention include one or more fans having alternate locations. Other embodiments may include a flywheel attached to the fan 34. Other embodiments do not include a fan or flywheel and rely solely on air flow generated by the motion of the vehicle 22.

The housing 16 further comprises an attachment means for connecting the projection surface 20 to the housing 16. It will be appreciated that the attachment means could include screws, nuts and bolts, clips, and magnets; however, in at least one preferred embodiment, best shown in FIG. 5, the projection surface 20 is constrained using a set of finger-like tangs 36, providing a convenient, tool-free method of attachment and detachment. The tangs 36 are attached to diametrically opposed ends of the housing 16 at or near the circular front surface 32, and project radially inward. The each tang 36 is adapted to be inserted within a pocket sewn into the distal end of the projection surface 20 so as to securely fasten the projection surface 20 to the housing 16. It will be appreciated that the tangs 36 may be constructed of either rigid material or flexible material.

In at least one preferred embodiment of the present invention, perhaps best seen in FIG. 6, the projection surface 20 includes an attachment portion 38 located at or near a distal end thereof and a simulated flame portion 40. In one or more preferred embodiments, the attachment portion 38 comprises one or more pockets sewn into the distal end of the projection surface 20, said pockets being configured to align with and envelope the one or more tangs 36 located on the housing 16. The projection surface 20 may be rigid or flexible; however, airflow generated by movement of the vehicle 22, by the fan 34, or by a combination of both, will enhance the flame-like appearance of a flexible projection surface 20. If a rigid projection surface is used, it will preferably be hinged or mechanically attached to reduce the risk of breakage or injury.

The attachable flame simulating apparatus 10 requires an energy source to power the light sources 18 and the optional fan 34. It will be appreciated that a variety of methods could be used, such as hard wiring the apparatus 10 to the vehicle 22, batteries, solar panels, fuel cells, or even a portable nuclear reactor. However, in one or more preferred embodiments, the flame simulating apparatus 10 uses an adapter plug 42 that connects to the trailer electrical receptacle 44. This electrical integration with the vehicle 22 also permits the flame simulating apparatus 10 to respond in programmable ways, such as when the vehicle's lights are turned on, when the brakes are applied, or when turn signals or hazard flashers are selected. For example, in at least one contemplated embodiment, the brightness of the light emitted by the one or more light sources 18 is proportional to the amount of acceleration being applied by the driver of the vehicle 22 via the acceleration pedal.

Additionally, a flame simulating apparatus in accordance with one or more other embodiments of the present invention includes alternative attachment means of the apparatus to the vehicle. For example, mounting the apparatus to the vehicle using rubber feet, brackets, screws, nuts and bolts, and magnets. In another embodiment, the projection device could be replaced by an alternative light guide material that displays the simulated flame appearance.

Figure 7:
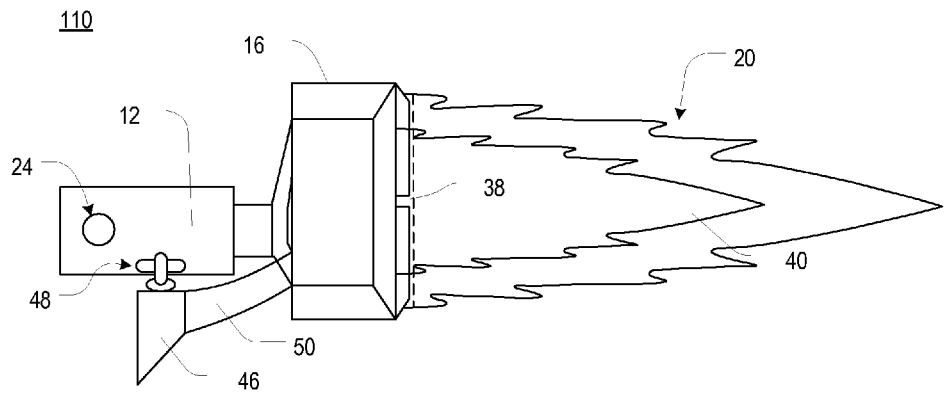
FIG. 7 is a side view of an attachable flame simulating apparatus in accordance with one or more preferred embodiments of the present invention.
Figure 8:
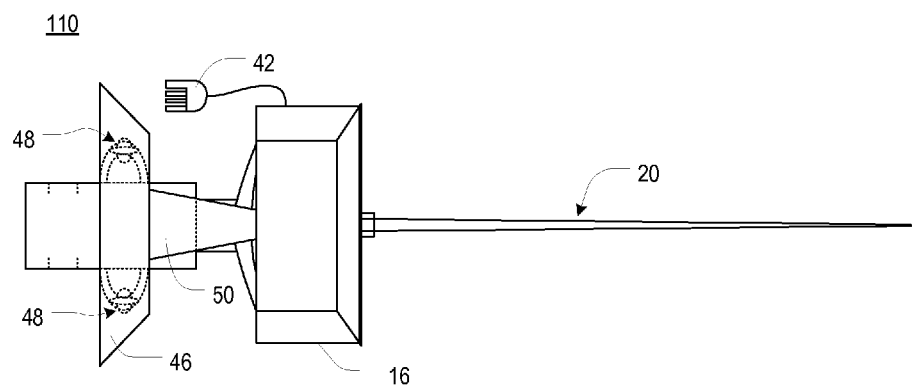
FIG. 8 is a bottom view of the attachable flame simulating apparatus of FIG. 7.

FIG. 7 is a detailed side view of a flame simulating apparatus 110 in accordance with an alternative embodiment of the present invention. FIG. 8 is a detailed bottom view of the flame simulating apparatus 110 of FIG. 7. FIG. 8 further includes hidden portions of the flame simulating apparatus 110 shown in broken lines. As seen in FIGS. 7 and 8, the flame simulating apparatus 110 is similar to flame simulating apparatus 10 in most respects, but further includes an air deflecting device 46. It will be appreciated that increasing airflow toward or over the projection surface improves the appearance of a flame simulation. The air deflecting device 46 is an appendage that redirects ram air from under the moving vehicle 22 toward and/or into the housing 16. In at least one preferred embodiment, the air deflecting device 46 is shorter and wider than the housing 16 to limit exposure to road debris. The air deflecting device 46 may further include a screw 48 or other suitable means to attach the air deflection device 46 to the vehicle 22 directly, or to the vehicle 22 via a receiver-type hitch 14.

In at least one preferred embodiment, the air deflecting device 46 is an air scoop that redirects and concentrates air into the proximal end of the housing 16. The redirected air travels through the housing 16 and onto the projection surface 20, thus increasing air flow to the simulated flame portion 40 of the projection surface 20. The increased airflow results in a more realistic-looking simulated flame. The air scoop is further beneficial because it helps offset unwanted drafts or eddies around the vehicle which could disrupt the projection surface 20. The air scoop may be directly connected to the proximal end of the housing 16, or alternatively, a duct 50 may be used to connect the air scoop to the proximal end of the housing 16 and further control the flow of air. The duct 50 may be rigid, flexible, mobile, or stationary. Furthermore, the duct 50 may be equipped with a mechanism allowing the duct 50 to swivel.

Figure 9:
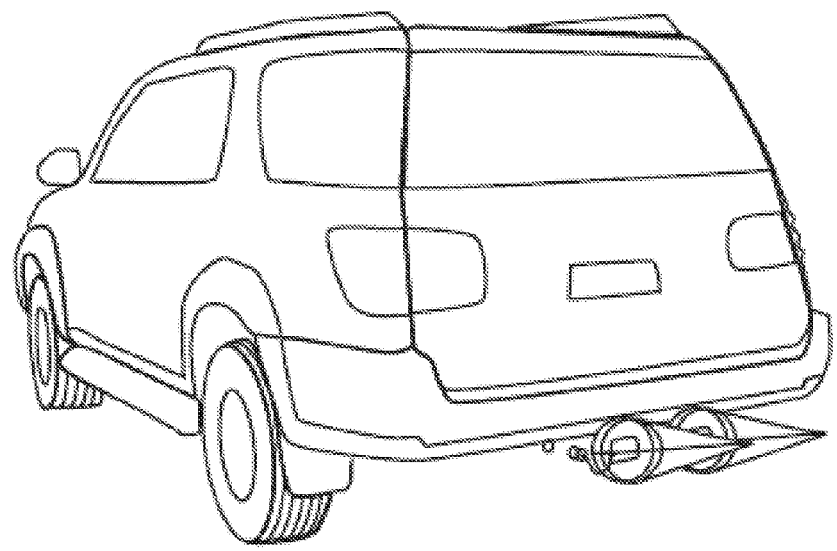
FIG. 9 is perspective view of a flame simulating apparatus which simulates the appearance of multiple flames.

Still further, although illustrated largely as simulating a single flame, in at least some preferred embodiments one or more flame simulating devices are configured to simulate multiple flames, as illustrated in FIG. 9.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. An attachable flame simulating apparatus, comprising:
   (a) a coupling appendage having a distal end and a proximal end;
   (b) a housing adjacent the proximal end of the coupling appendage, the housing comprising one or more light sources; and
   (c) a flexible flame simulation projection surface extending from the housing, the flexible flame simulation projection surface being pliable so as to generally undulate and simulate a flame when air flows past the flexible flame simulation projection surface;
   (d) wherein the one or more light sources project light towards the flexible flame simulation projection surface so as to enhance the simulation of a flame by the flexible flame simulation projection surface when air flows past the flexible flame simulation projection surface;
   (e) wherein the distal end of the coupling appendage is removably attachable to a receiver-type trailer hitch of a vehicle.

2. The attachable flame simulating apparatus of claim 1, wherein the distal end of the coupling appendage is removably attachable to a Class I type hitch.

3. The attachable flame simulating apparatus of claim 1, wherein the distal end of the coupling appendage is removably attachable to a Class II type hitch.

4. The attachable flame simulating apparatus of claim 1, wherein the distal end of the coupling appendage is removably attachable to a Class III type hitch.

5. The attachable flame simulating apparatus of claim 1, wherein the distal end of the coupling appendage is adapted to fit a Class IV type hitch.

6. A method of simulating a rocket powered vehicle comprising:
   (a) providing an attachable flame simulating apparatus, comprising:
      (i) a coupling appendage having a distal end and a proximal end;
      (ii) a housing adjacent the proximal end of the coupling appendage, the housing comprising one or more light sources;
      (iii) an adapter plug in electrical connection with the one or more light sources for powering the one or more light sources; and
      (iv) a flexible flame simulation projection surface extending from the housing, the flexible flame simulation projection surface being pliable so as to generally undulate and simulate a flame when air flows past the flexible flame simulation projection surface;
   (b) inserting the distal end of the coupling appendage into a receiver-type trailer hitch attached to a vehicle;
   (c) plugging the adapter plug into a trailer electrical receptacle associated with the vehicle;
   (d) driving the vehicle so as to cause air to flow past the flexible flame simulation project surface, the air flow causing the flexible flame simulation projection surface to generally undulate and simulate a flame; and
   (e) projecting, by the one or more light sources, light onto the flexible flame simulation projection surface so as to enhance the simulation of a flame by the flexible flame simulation projection surface as air flows past the flexible flame simulation projection surface.

7. The method of claim 6, wherein the housing further includes an electrically powered fan, and wherein the method includes directing, by the fan, air past the flame simulation projection surface.

8. The method of simulating a rocket powered vehicle of claim 6, wherein a brightness level of at least some light projected by the one or more light sources is controlled by an amount of acceleration being effected by a driver of the vehicle via an acceleration pedal of the vehicle.

9. The method of simulating a rocket powered vehicle of claim 6, wherein a color of at least some light projected by the one or more light sources is controlled by an amount of acceleration being effected by a driver of the vehicle via an acceleration pedal of the vehicle.

10. The method of simulating a rocket powered vehicle of claim 6, wherein light is projected by the one or more light sources based on application of brakes of the vehicle.

11. The method of simulating a rocket powered vehicle of claim 6, wherein light is projected by the one or more light sources based on use of turn signals of the vehicle.

12. The method of simulating a rocket powered vehicle of claim 6, wherein light projected by the one or more light sources responds in a programmable way.

13. The method of claim 6, wherein the housing further includes a fan and one or more openings, and wherein driving the vehicle causes air to travel through the one or more openings so as to cause the fan to rotate and direct air toward the flame simulation projection surface.

14. An attachable flame simulating apparatus, comprising:
   (a) a coupling appendage having a distal end and a proximal end;
   (b) a housing adjacent the proximal end of the coupling appendage, the housing comprising one or more light sources; and
   (c) a flexible flame simulation projection surface extending from the coupling appendage, the flexible flame simulation projection surface being pliable so as to generally undulate and simulate a flame when air flows past the flexible flame simulation projection surface;
   (d) wherein the one or more light sources project light towards the flexible flame simulation projection surface so as to enhance the simulation of a flame by the flexible flame simulation projection surface when air flows past the flexible flame simulation projection surface;
   (e) wherein the distal end of the coupling appendage is removably attachable to a receiver-type trailer hitch of a vehicle.

15. The attachable flame simulating apparatus of claim 14, wherein the distal end of the coupling appendage is removably attachable to a Class I type hitch.

16. The attachable flame simulating apparatus of claim 14, wherein the distal end of the coupling appendage is removably attachable to a Class II type hitch.

17. The attachable flame simulating apparatus of claim 14, wherein the distal end of the coupling appendage is removably attachable to a Class III type hitch.

18. The attachable flame simulating apparatus of claim 14, wherein the distal end of the coupling appendage is removably attachable to a Class IV type hitch.

19. The attachable flame simulating apparatus of claim 14, wherein the housing comprises an electrically powered fan.

20. The attachable flame simulating apparatus of claim 14, wherein the housing comprises a fan configured to rotate and direct air toward the flame simulation projection surface.

* * * * *